(12) United States Patent
Chen et al.

(10) Patent No.: US 9,402,172 B2
(45) Date of Patent: Jul. 26, 2016

(54) MESSAGE COMBINATION METHOD AND DEVICE

(71) Applicant: TENCENT TECHNOLOGY (SHENZHEN) COMPANY LIMITED, Guangdong (CN)

(72) Inventors: Chuhao Chen, Guangdong (CN); Feijun Li, Guangdong (CN)

(73) Assignee: TENCENT TECHNOLOGY (SHENZHEN) COMPANY LIMITED (CN)

(*) Notice: Subject to any disclaimer, the term of this patent is extended or adjusted under 35 U.S.C. 154(b) by 0 days.

(21) Appl. No.: 14/564,767

(22) Filed: Dec. 9, 2014

(65) Prior Publication Data

US 2015/0094107 A1 Apr. 2, 2015

Related U.S. Application Data

(63) Continuation of application No. PCT/CN2013/077870, filed on Jun. 25, 2013.

(30) Foreign Application Priority Data

Jun. 26, 2012 (CN) .......................... 2012 1 0213304

(51) Int. Cl.
*H04W 4/00* (2009.01)
*H04W 4/14* (2009.01)
(Continued)

(52) U.S. Cl.
CPC ........ *H04W 4/14* (2013.01); *H04W 4/12* (2013.01); *H04W 8/18* (2013.01)

(58) Field of Classification Search
CPC ........... H04W 4/02; H04W 4/06; H04W 4/12; H04W 4/14; H04W 8/18

USPC .................. 455/412.1, 412.2, 414.1, 466
See application file for complete search history.

(56) References Cited

U.S. PATENT DOCUMENTS

| 6,597,918 B1* | 7/2003 | Kim ................ H04L 12/5835 370/236 |
| 2004/0122902 A1* | 6/2004 | Anderson .............. G06Q 10/10 709/206 |

(Continued)

FOREIGN PATENT DOCUMENTS

| CN | 1867093 | 11/2006 |
| CN | 101404797 | 4/2009 |

(Continued)

OTHER PUBLICATIONS

International Search Report, PCT/CN2013/077870, Tencent Technology (Shenzhen) Company Limited, Oct. 3, 2013.
(Continued)

*Primary Examiner* — Jean Gelin
(74) *Attorney, Agent, or Firm* — McDonald Hopkins LLC (57) ABSTRACT

The method comprises: receiving a first message, and determining that the first message carries a sub-message identifier, the sub-message identifier being used for indicating that the first message is one of several sub-messages comprising a short message; according to the first message, allocating a storage space to the short message, the number of the storage units contained in the storage space being equal to the number of the sub-message contained in the short message, the storage units contained in the storage space having a location order; according to the first message and the sub-message identifier of at least one second message subsequently received, storing the first message and the at least one second message subsequently received into corresponding storage units in the storage space; and combining the sub-message stored in the storage units in the storage space.

20 Claims, 3 Drawing Sheets

(51) Int. Cl.
*H04W 4/12* (2009.01)
*H04W 8/18* (2009.01)

(56) References Cited

U.S. PATENT DOCUMENTS

| | | | | |
|---|---|---|---|---|
| 2006/0079255 A1* | 4/2006 | Bantukul | H04L 12/585 | 455/466 |
| 2007/0230506 A1* | 10/2007 | Zou | H04L 12/5835 | 370/473 |
| 2009/0061910 A1* | 3/2009 | Garba | H04L 12/5875 | 455/466 |
| 2009/0265552 A1* | 10/2009 | Moshir | H04L 63/0464 | 713/168 |
| 2011/0165895 A1* | 7/2011 | Ryan | H04W 4/14 | 455/466 |

FOREIGN PATENT DOCUMENTS

| | | |
|---|---|---|
| CN | 101404797 A | 4/2009 |
| WO | 2011113392 | 9/2010 |
| WO | WO2011/113392 | 9/2011 |

OTHER PUBLICATIONS

Patent Abstract of CN1867093, Method for Enhancing Short Message Communication, Huawei Technologies Co., Ltd., Nov. 22, 2006.
Patent Abstract of CN101404797, Storage Method, Storage Management Apparatus and Storage System for Long Message, ZTE Corp., Apr. 8 , 2009.
Office Action for Chinese Patent Application No. 2012102133047 issued Feb. 13, 2015.

* cited by examiner

MESSAGE COMBINATION METHOD AND DEVICE

CROSS REFERENCE TO RELATED APPLICATIONS

This Application is a continuation application of PCT application No. PCT/CN2013/077870, filed on Jun. 25, 2013 which claims priority to a Chinese patent application No. 201210213304.7 filed on Jun. 26, 2012, disclosures of both of which are incorporated herein by reference in their entireties.

TECHNICAL FIELD

The present invention relates to the field of communication technologies, and in particular to a message combination method and device.

TECHNICAL BACKGROUND

With the development of communication technologies, a short message becomes an important means by which an operator sends information to users. For example, according to a query short message sent from a mobile terminal, the operator returns a short message containing information such as expenditures, traffic statistics and service packages to the mobile terminal. However, since the number of words of the short message is limited by the short message service provider, the short message returned by the operator may be divided into multiple sub-messages. In order to obtain correct contents contained in the short message, these sub-messages need to be processed in combination accurately. Otherwise, it win affect subsequent analysis processes and hence analysis results. Therefore, there is a need in the prior art to provide a message combination solution which can accurately combine the divided multiple sub-messages, thus restoring the correct content contained in the short message.

SUMMARY

In order to solve the above problem in the prior art, Embodiments of the present invention provides a message combination method and device of which technical solutions are set forth as follows.

In one aspect, it is provided a message combination method, including:

receiving a first message and determining a sub-message identifier carried in the first message, with the sub-message identifier being configured for indicating that the first message is one of a plurality of sub-messages forming a short message;

allocating a storage space to the short message according to the first message, with the number of storage units contained in the storage space being equal to the number of the sub-messages contained in the short message, and the storage units contained in the storage space having ordered positions:

storing the first message and the subsequently received at least one second message to corresponding storage units in the storage space according to sub-message identifiers of both the first message and the subsequently received at least one second message; and combining the sub-messages stored in all the storage units in the storage space.

The receiving a first message and determining a sub-message identifier carried in the first message, with the sub-message identifier being configured for indicating that the first message is one of a plurality of sub-messages forming a short message includes:

receiving a first message and determining according to a preset characteristic information repository whether the first message carries information consistent with any one of characteristic information in the preset characteristic information repository, so as to determine that the first message carries the sub-message identifier if the first message carries the information consistent with any one of characteristic information in the preset characteristic information repository.

The allocating a storage space to the short message according to the first message, with the number of storage units contained in the storage space being equal to the number of the sub-messages contained in the short message, and the storage units contained in the storage space having ordered positions includes:

determining the number of the sub-messages contained in the short message according to the sub-message identifier; and allocating the storage space to the short message according to the number of the sub-messages contained in the short message, with the number of storage units contained in the storage space being equal to the number of the sub-messages contained in the short message, and the storage units contained in the storage space having ordered positions.

The storing the first message and the subsequently received at least one second message to corresponding storage units in the storage space according to the sub-message identifiers of both the first message and subsequently received at least one second message includes:

obtaining, according to the sub-message identifiers of both the first message and the subsequently received at least one second message, positions of the first message and the subsequently received at least one second message in the short message, respectively; and storing, according to the positions of the first message and the subsequently received at least one second message in the short message as well as the ordered position of each of the storage units in the storage space, the first message and the subsequently received at least one second message to the corresponding storage units of which the ordered positions in the storage space correspond to the positions of the first message and the subsequently received at least one second message in the short message, respectively.

The combining the sub-messages stored in all the storage units in the storage space includes:

determining whether each of the storage units in the storage space has stored a sub-message, and combining the sub-messages stored in all the storage units in the storage space if each of the storage units in the storage space has stored a sub-message.

After determining whether each of the storage units in the storage space has stored a sub-message, the method further includes:

ending, if not all of the storage units in the storage space have stored a sub-message and it is determined that a time period from time of receiving the first message to current time exceeds a preset time period.

The sub-message identifier is information either prefixed or suffixed to the first message.

In another aspect, it is provided a message combination device, including;

a reception module configured for receiving a first message and determining a sub-message identifier carried in the first message, with the sub-message identifier being configured for indicating that the first message is one of a plurality of sub-messages forming a short message;

an allocation module configured for allocating a storage space to the short message according to the first message, with the number of storage units contained in the storage space being equal to the number of the sub-messages contained in the short message, and the storage units contained in the storage space having ordered positions;

a storage module configured for storing the first message and the subsequently received at least one second message to corresponding storage units in the storage space according to sub-message identifiers of both the first message and the subsequently received at least one second message; and a combination module configured for combining the sub-messages stored in all the storage units in the storage space.

The reception module is specifically configured for receiving a first message and determining according to a preset characteristic information repository whether the first message carries information consistent with any one of characteristic information in the preset characteristic information repository, so as to determine that the first message carries the sub-message identifier if the first message carries the information consistent with any one of characteristic information in the preset characteristic information repository.

The allocation module includes:

a determination unit configured for determining the number of the sub-messages contained in the short message according to the sub-message identifier;

an allocation unit configured for allocating the storage space to the short message according to the number of the sub-messages contained in the short message, with the number of storage units contained in the storage space being equal to the number of the sub-messages contained in the short message.

The storage module is specifically configured for obtaining, according to the sub-message identifiers of both the first message and the subsequently received at least one second message, positions of the first message and the subsequently received at least one second message in the short message, respectively; and storing, according to the positions of the first message and the subsequently received at least one second message in the short message as well as the ordered position of each of the storage units in the storage space, the first message and the subsequently received at least one second message to the corresponding storage units of which the ordered positions in the storage space correspond to the positions of the first message and the subsequently received at least one second message in the short message, respectively.

The combination module is specifically configured for determining whether each of the storage units in the storage space has stored a sub-message, and combining the sub-messages stored in all the storage units in the storage space if each of the storage units in the storage space has stored a sub-message.

The combination module is further configured for ending, if not all of the storage units in the storage space have stored a sub-message and it is determined that a time period from time of receiving the first message to current time exceeds a preset time period.

The sub-message identifier is information either prefixed or suffixed to the first message.

The message combination method and device according to embodiments of the present invention: receiving a first message and determining a sub-message identifier carried in the first message, with the sub-message identifier being configured for indicating that the first message is one of a plurality of sub-messages forming a short message; allocating a storage space to the short message according to the first message, with the number of storage units contained in the storage space being equal to the number of the sub-messages contained in the short message, and the storage units contained in the storage space having ordered positions; storing the first message and the subsequently received at least one second message to corresponding storage units in the storage space according to sub-message identifiers of both the first message and the subsequently received at least one second message; and combining the sub-messages stored in and the storage units in the storage space. With the technical solution of the present disclosure, the sub-messages divided from the short message can be determined quickly, and both the position of the first message in the short message and the number of the sub-messages contained in the short message are determined from the sub-message identifier of the first message, so that the sub-messages are stored and combined together according to the sub-message identifiers thereof, resulting in a high combination speed and an accurate combination result, thus avoiding the occurrence of combination errors.

DESCRIPTION OF DRAWINGS

Accompanying drawings needed for describing embodiments of the invention arc briefly introduced below in order to illustrate the technical solutions in the embodiments of the present invention more clearly. Apparently, the drawings in the following description are merely some embodiments of the invention, and other drawings can be obtained according to the drawings by those skilled in the art without any creative work.

DETAILED DESCRIPTION OF THE PREFERRED EMBODIMENT

In order to make objects, technical solutions and advantages of the disclosure more clearly, embodiments of the invention are further described in detail below in conjunction with the accompanying drawings.

Figure 1:
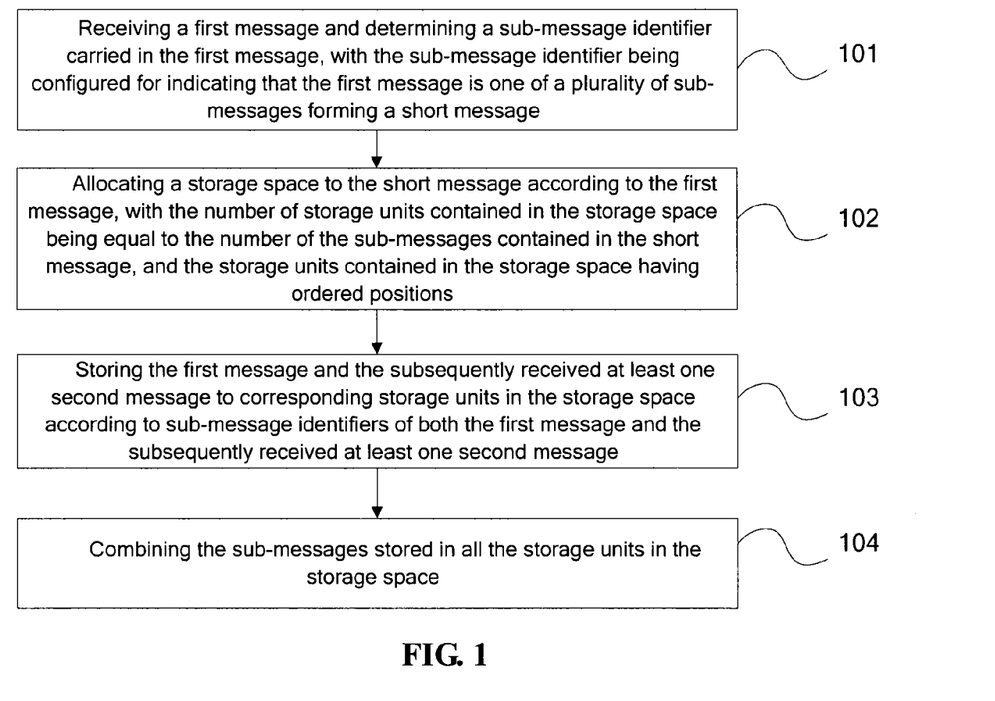
FIG. 1 is a flowchart showing a message combination method according to an embodiment of the present invention.

FIG. 1 is a flowchart showing a message combination method according to an embodiment of the present invention. An executive body in the present embodiment is a mobile terminal which may be a smartphone, a tablet computer, an Moving Picture Experts Group Audio Layer III (MP3), a Personal Digital Assistant (PDA) and so on. Referring to FIG. 1, the method includes Steps 101 to 104 below.

Step 101: receiving a first message and determining a sub-message identifier carried in the first message, with the sub-message identifier being configured for indicating that the first message is one of a plurality of sub-messages forming a short message;

Step 102: allocating a storage space to the short message according to the first message, with the number of storage units contained in the storage space being equal to the number of the sub-messages contained in the short message, and the storage units contained in the storage space having ordered positions;

Step 103: storing the first message and the subsequently received at least one second message to corresponding storage units in the storage space according to sub-message identifiers of both the first message and the subsequently received at least one second message; and Step 104: combining the sub-messages stored in all the storage units in the storage space.

Optionally, the receiving a first message and determining a sub-message identifier carried in the first message, with the sub-message identifier being configured for indicating that the first message is one of a plurality of sub-messages forming a short message includes:

receiving a first message and determining according to a preset characteristic information repository whether the first message carries information consistent with any one of characteristic information in the preset characteristic information repository, so as to determine that the first message carries the sub-message identifier if the first message carries the information consistent with any one of characteristic information in the preset characteristic information repository.

Optionally, the allocating a storage space to the short message according to the first message, with the number of storage units contained in the storage space being equal to the number of the sub-messages contained in the short message, and the storage units contained in the storage space having ordered positions includes:

determining the number of the sub-messages contained in the short message according to the sub-message identifier; and allocating the storage space to the short message according to the number of the sub-messages contained in the short message, with the number of storage units contained in the storage space being equal to the number of the sub-messages contained in the short message, and the storage units contained in the storage space having ordered positions.

Optionally, the storing the first message and the subsequently received at least one second message to corresponding storage units in the storage space according to the sub-message identifiers of both the first message and subsequently received at least one second message includes:

obtaining, according to the sub-message identifiers of both the first message and the subsequently received at least one second message, positions of the first message and the subsequently received at least one second message in the short message, respectively; and storing, according to the positions of the first message and the subsequently received at least one second message in the short message as well as the ordered position of each of the storage units in the storage space, the first message and the subsequently received at least one second message to the corresponding storage units of which the ordered positions in the storage space correspond to the positions of the first message and the subsequently received at least one second message in the short message, respectively.

Optionally, the combining the sub-messages stored in all the storage units in the storage space includes:

determining whether each of the storage units in the storage space has stored a sub-message, and combining the sub-messages stored in all the storage units in the storage space if each of the storage units in the storage space has stored a sub-message.

Optionally, after determining whether each of the storage units in the storage space has stored a sub-message, the method further includes:

ending, if not all of the storage units in the storage space have stored a sub-message and it is determined that a time period from time of receiving the first message to current time exceeds a preset time period.

Optionally, the sub-message identifier is information either prefixed or suffixed to the first message.

As such, the message combination method according to an embodiment of the invention includes: receiving a first message and determining a sub-message identifier carried in the first message, with the sub-message identifier being configured for indicating that the first message is one of a plurality of sub-messages forming a short message; allocating a storage space to the short message according to the first message, with the number of storage units contained in the storage space being equal to the number of the sub-messages contained in the short message, and the storage units contained in the storage space having ordered positions; storing the first message and the subsequently received at least one second message to corresponding storage units in the storage space according to sub-message identifiers of both the first message and the subsequently received at least one second message; and combining the sub-messages stored in all the storage units in the storage space. With the technical solution of the present disclosure, the sub-messages divided from the short message can be determined quickly, and both the position of the first message in the short message and the number of the sub-messages contained in the short message are determined from the sub-message identifier of the first message, so that the sub-messages are stored and combined together according to the sub-message identifiers thereof, resulting in a high combination speed and an accurate combination result, thus avoiding the occurrence of combination errors.

Figure 2:
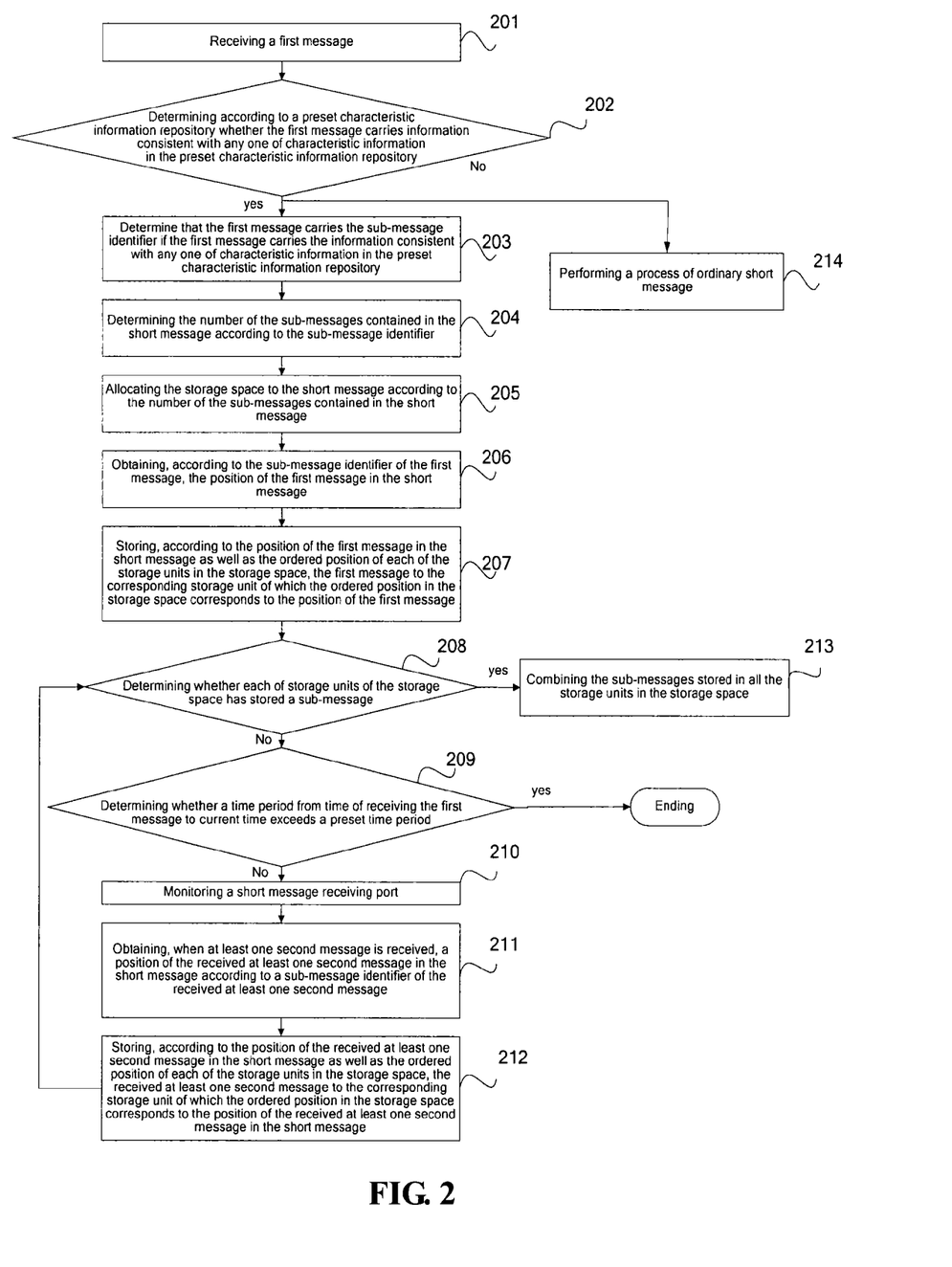
FIG. 2 is a flowchart showing a message combination method according to an embodiment of the present invention.

FIG. 2 is a flowchart showing a message combination method according to an embodiment of the present invention. An executive body in the present embodiment is a mobile terminal. The embodiment of the invention is described in detail on the basis of the embodiment shown in FIG. 1. Referring to FIG. 2, the message combination method according to the present embodiment specifically includes Steps 201 to 212 below.

Step 201: receiving a first message;

The first message in the present embodiment refers to a received first sub-message. As for a mobile terminal with functions of receiving, sending and editing a short message, the mobile terminal can receive various messages, including a multimedia message, a short message and a sub-message, etc. The embodiment of the present invention is illustrated for example as a method for combining multiple sub-messages divided from a short message. It is noted that the short message, which includes information such as expenditures, service packages and traffic statistics, may be a message sent periodically by an operator, or may also be a message requested by the mobile terminal to the operator.

Step 202: determining according to a preset characteristic information repository whether the first message carries information consistent with any one of characteristic information in the preset characteristic information repository: if so, then performing Step 203; otherwise performing Step 214.

The preset characteristic information repository includes one or more characteristic information for identifying the sub-messages. When the first message is received, it is analyzed by a String Pattern Matching method whether the first message carries information consistent with any one of characteristic information in the preset characteristic information repository. If the first message carries information consistent with any one of characteristic information in the preset characteristic information repository, then it is determined that the first message carries the sub-message identifier, and information in the first message which is consistent with any one of characteristic information is the sub-message identifier of the first message. If the first message does not carry information consistent with any one of characteristic information in the preset characteristic information repository, then it is determined that the first message is not divided from the short message and a processing for ordinary short message is performed on such first message. The processing includes, but not limited to, a storing processing and a displaying processing and so on.

It is noted that the characteristic information in the preset characteristic information repository need to be collected based on manual work. For example, the characteristic information is saved to the preset characteristic information repository in the form of the known sub-message identifier, and since the form of the sub-message identifier has the relatively small and fixed information amount, it is convenient to be collected and maintained.

Step 203: determine that the first message carries the sub-message identifier if the first message carries the information consistent with any one of characteristic information in the preset characteristic information repository.

Specifically, it is determined whether characteristic information consistent with either prefix information or suffix information in the first message is present in the preset characteristic information repository; if so, then it is determined that the first message carries the sub-message identifier, i.e. the sub-message identifier is either the prefix information or the suffix information in the first message. For example, the first message includes below:

"enjoy free in the night) a total of 300 minutes, 0 minute used, 660 minutes free calling time (local, domestic roaming—local, domestic long-distance call) a total of 600 minutes, 317 minutes used, local and domestic (2/4)"

the above first message is analyzed by the String Pattern Matching method, finding that the suffix information (2/4) in the first message is consistent with the characteristic information in the present characteristic information repository, and it is then determined that the first message is divided from the short message and the suffix information (2/4) is the sub-message identifier of the first message.

Step 204: determining the number of the sub-messages contained in the short message according to the sub-message identifier.

Optionally, the sub-message identifier is configured for indicating that current sub-message is a part of the divided short message, and further configured for indicating the number of the sub-messages divided from the short message as well as a position of the current sub-message in the short message.

A structure of the sub-message identifier is analyzed according to the characteristic information in the preset characteristic information repository so as to determine, in the sub-message identifier, a portion for representing the number of the sub-messages and a portion for representing the position of the current sub-message in the short message, and obtain the number of the sub-messages and the position of the current sub-message in the short message.

For example, as for the sub-message identifier (2/4) from the example in Step 203, the sub-message identifier is configured for indicating that the current sub-message is a part of the divided short message, and further configured for indicating that the number of the sub-messages divided from the short message is 4 and the position of the current sub-message in the short message is the 2-th position (i.e., the current sub-message is in the 2-th position of the short message).

Step 205, allocating the storage space to the short message according to the number of the sub-messages contained in the short message, with the number of storage units contained in the storage space being equal to the number of the sub-messages contained in the short message.

In the present embodiment, the storage space refers to a segment of storage space including multiple storage units allocated for the short message. In a magnetic disk of the mobile terminal, the storage space may be provided with continuous addresses, or associated discontinuous addresses. The number of storage units contained in the storage space is equal to the number of the sub-messages contained in the short message, and the storage units have ordered positions. For example, for a short message containing 4 sub-messages, four storage units are allocated to the short message and the four storage units have ordered positions, where a first storage unit of the four storage units stores a sub-message at the first position in the short message, a second storage unit of the four storage units stores a sub-message at the second position in the short message, and so on. As for the storage space with the continuous addresses, the ordered position of the storage units can be shown by addresses of the storage units, and as for the storage space with associated discontinuous addresses, the ordered positions of the storage units can be shown not only by addresses of the storage units but also by associated relationships between the storage addresses and the positions of the storage units created when allocating the storage units. For example, for a short message containing four sub-messages, four storage units, namely [000000010000, 000000110000], [100000010000, 100000110000], [000100010000, 000100110000], [010000010000, 0100000110000], are allocated to the short message, and the position sequence of the four storage units can be shown by the created associated relationships between the storage addresses and the positions of the storage units, for example, the storage unit [000000010000, 000000110000] stores a first sub-message, the storage unit [100000010000, 100000110000] stores a second sub-message, the storage unit [000100010000, 000100110000] stores a third sub-message, and the storage unit [010000010000, 0100000110000] stores a fourth sub-message.

Step 206: obtaining, according to the sub-message identifier of the first message, the position of the first message in the short message.

A structure of the sub-message identifier is analyzed according to characteristic information in the preset characteristic information repository so as to determine, in the sub-message identifier, a portion for representing the number of the sub-messages and a portion for representing the position of the current sub-message in the short message, and obtain the number of the sub-messages and the position of the current sub-message in the short message.

The first message is a first sub-message which is divided from the short message and received by the mobile terminal, the number of the sub-messages is determined according to the first message in the present embodiment, and the storage space is allocated to the short message according to the number of the sub-messages, thus acquisitions of the number of the sub-messages and the position of the first sub-message in the short message are described respectively. Actually, the position of the first message in the short message may be obtained while the number of the sub-messages is obtained according the sub-message identifier of the first message. In other words, Steps 206 and 204 can be performed simultaneously to obtain the number of the sub-messages and the position of the first message by the sub-message identifier. In order to emphasize on the allocation of the storage space, the present disclosure describes Steps 204 and 206, respectively. In another embodiment, Steps 204 and 206 can be performed prior to Step 205.

Step 207: storing, according to the position of the first message in the short message as well as the ordered position of each of the storage units in the storage space, the first message to the corresponding storage unit of which the ordered position in the storage space corresponds to the position of the first message.

When the storage space is allocated, each of the storage units has an ordered position. Each of the storage units is configured for storing, according to the ordered position of the storage unit, a sub-message corresponding to the ordered position which is divided from the short message. For example, as for the sub-message of which the sub-message identifier is (2/4) in the example in Step 204, since it is located in a second position in the short message, that sub-message is stored in the storage unit of which the ordered position in the storage space is the second position.

Step 208: determining whether each of storage units of the storage space has stored a sub-message, and if so, then performing step 213; otherwise, performing step 209.

If each of storage units in the storage space has stored a sub-message, then it is determined that the sub-messages divided from the short message have been collected completely, so that the sub-messages stored in all the storage units in the storage space can be combined together according to the ordered positions of the storage units and then outputted, i.e. Step 213 is performed. However, if not all of the storage units in the storage space have stored a sub-message, then it is determined that sub-messages divided from the short message have not yet been collected completely, and it is also necessary to continue receiving the remaining sub-messages.

It is noted that the determination in the present embodiment is performed after each time the sub-message is received, but in the actual scenario, the determination can be performed periodically rather than after each time the sub-message is received.

Step 209: determining whether a time period from time of receiving the first message to current time exceeds a preset time period, if so, then ending; otherwise, performing step 210.

In general, a plurality of sub-messages divided from the short message win be sent from a server for a certain time period, but some sub-message may be delayed to be received due to network reasons or other faults. To improve the message combining efficiency and save the disk space, the time period from time of receiving the first message to the current time needs to be monitored, and if the time period from time of receiving the first message to the current time exceeds the preset time period, then the received sub-message is not processed with respect to combination, but the storage space can be cleared and released, and a reception failing message is sent to the server so that the server resend the sub-message; otherwise, if the time period from time of receiving the first message to the current time does not exceed the preset time period, then continuing performing Step 210 to obtain the sub-message.

The preset time period can be set or adjusted by those skilled or the mobile terminal users, which is not specifically limited thereto in the present embodiment of the present invention.

Step 210: monitoring a short message receiving port.

If not all of the storage units in the storage space have stored a sub-message, then it is determined that sub-messages divided from the short message have not yet been collected completely, and it is also necessary to continue receiving other sub-messages, and in this case, the short message receiving port needs to be monitored, so that Step 211 is performed when a second message is received.

Step 211: obtaining, when at least one second message is received, a position of the received at least one second message in the short message according to a sub-message identifier of the received at least one second message.

For ease of illustration, all sub-messages divided from the short message that are received subsequent to the first message are considered as the second message.

It is noted that Step 211 has the same principle as Step 206, which is not discussed repeatedly herein.

Step 212: storing, according to the position of the received at least one second message in the short message as well as the ordered position of each of the storage units in the storage space, the received at least one second message to the corresponding storage unit of which the ordered position in the storage space corresponds to the position of the received at least one second message in the short message, and performing Step 208;

It is noted that Step 212 has the same principle as Step 207, which is not discussed repeatedly herein.

In the present embodiment,

Step 213: combining the sub-messages stored in all the storage units in the storage space, and then ending.

Specifically, If each of storage units of the storage space has stored a sub-message, then it is determined that the sub-messages divided from the short message have been collected completely, and then the sub-message stored in each of storage units can be combined together according to the ordered position of the storage unit, so as to output the combined short message.

The combined short message can be configured for analyzing messages containing information such as expenditures, service packages or traffic statistics and so on, sent by the server of the operator, and the combination accuracy is much high.

Step 214: performing a process of ordinary short message on the first message.

If the first message does not carry such information consistent with any one of characteristic information of the preset characteristic information repository, then it is determined that the first message is not divided from the short message and the process for ordinary short message is performed on the first message. The processing includes, but not limited to, a storing processing and a displaying processing and so on.

As such, the message combination method according to the embodiment of the invention includes: receiving a first message and determining a sub-message identifier carried in the first message, with the sub-message identifier being configured for indicating that the first message is one of a plurality of sub-messages forming a short message; allocating a storage space to the short message according to the first message, with the number of storage units contained in the storage space being equal to the number of the sub-messages contained in the short message, and the storage units contained in the storage space having ordered positions; storing the first message and the subsequently received at least one second message to corresponding storage units in the storage space according to sub-message identifiers of both the first message and the subsequently received at least one second message; and combining the sub-messages stored in all the storage units in the storage space. With the technical solution of the present disclosure, the sub-messages divided from the short message can be determined quickly, and both the position of the first message in the short message and the number of the sub-messages contained in the short message are determined from the sub-message identifier of the first message, so that the sub-messages are stored and combined together according to the sub-message identifiers thereof, resulting in a high combination speed and an accurate combination result, thus avoiding the occurrence of combination errors. The message combination method according to the present embodiment may be applied in analyzing the content of the short message, so as to combine, based on the technical solution according to the present embodiment, the sub-messages into the short message before analyzing the content of the short message, and may also be applied to the short message application in the terminal to combine the sub-messages into the short message, thereby being convenient for the user to view the short message.

Figure 3:
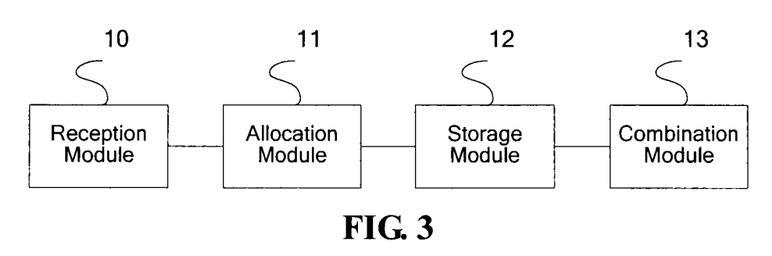
FIG. 3 is a schematic diagram showing the structure of a message combination device according to an embodiment of the present invention.

FIG. 3 is a schematic diagram showing the structure of a message combination device according to an embodiment of the present invention. Referring to FIG. 3, the device includes:

a reception module 10 configured for receiving a first message and determining a sub-message identifier carried in the first message, with the sub-message identifier being configured for indicating that the first message is one of a plurality of sub-messages forming a short message;

an allocation module 11 configured for allocating a storage space to the short message according to the first message, with the number of storage units contained in the storage space being equal to the number of the sub-messages contained in the short message, and the storage units contained in the storage space having ordered positions;

a storage module 12 configured for storing the first message and the subsequently received at least one second message to corresponding storage units in the storage space according to sub-message identifiers of both the first message and the subsequently received at least one second message; and a combination module 13 configured for combining the sub-messages stored in all the storage units in the storage space.

Optionally, the reception module 10 is specifically configured for receiving a first message and determining according to a preset characteristic information repository whether the first message carries information consistent with any one of characteristic information in the preset characteristic information repository, so as to determine that the first message carries the sub-message identifier if the first message carries the information consistent with any one of characteristic information in the preset characteristic information repository.

Optionally, the allocation module 11 includes:

a determination unit configured for determining the number of the sub-messages contained in the short message according to the sub-message identifier; and an allocation unit configured for allocating the storage space to the short message according to the number of the sub-messages contained in the short message, with the number of storage units contained in the storage space being equal to the number of the sub-messages contained in the short message.

Optionally, the storage module 12 is specifically configured for obtaining, according to the sub-message identifiers of both the first message and the subsequently received at least one second message, positions of the first message and the subsequently received at least one second message in the short message, respectively; and storing, according to the positions of the first message and the subsequently received at least one second message in the short message as well as the ordered position of each of the storage units in the storage space, the first message and the subsequently received at least one second message to the corresponding storage units of which the ordered positions in the storage space correspond to the positions of the first message and the subsequently received at least one second message in the short message, respectively.

Optionally, the combination module 13 is specifically configured for determining whether each of the storage units in the storage space has stored a sub-message, and combining the sub-messages stored in all the storage units in the storage space if each of the storage units in the storage space has stored a sub-message.

Optionally, the combination module 13 is further configured for ending, if not all of the storage units in the storage space have stored a sub-message and it is determined that a time period from time of receiving the first message to current time exceeds a preset time period.

Optionally, the sub-message identifier is information either prefixed or suffixed to the first message.

With the message combination device according to an embodiment of the present disclosure, the modules thereof are configured for, respectively, receiving a first message and determining a sub-message identifier carried in the first message, with the sub-message identifier being configured for indicating that the first message is one of a plurality of sub-messages forming a short message; allocating a storage space to the short message according to the first message, with the number of storage units contained in the storage space being equal to the number of the sub-messages contained in the short message, and the storage units contained in the storage space having ordered positions; storing the first message and the subsequently received at least one second message to corresponding storage units in the storage space according to sub-message identifiers of both the first message and the subsequently received at least one second message; and combining the sub-messages stored in all the storage units in the storage space. With the technical solution of the present disclosure, the sub-messages divided from the short message can be determined quickly, and both the position of the first message in the short message and the number of the sub-messages contained in the short message are determined from the sub-message identifier of the first message, so that the sub-messages are stored and combined together according to the sub-message identifiers thereof, resulting in a high combination speed and an accurate combination result, thus avoiding the occurrence of combination errors.

It is noted that for the message combination, the message combination device according to the above embodiment is illustrated for example merely in a manner of division of the above various function modules. However, in actual applications, the above functions can be distributed to be implemented by different function modules as needed, i.e. the internal structure of the device is divided into different function modules to achieve all or a part of the above-mentioned functions. Additionally, the message combination device according to the above embodiment has the same conception as the message combination method, so that specific implementation of the message combination device can refer to the embodiment for the message combination method in detail, which is not discussed repeatedly herein.

An embodiment of the present disclosure further provides a mobile terminal including the any of the above message combination devices.

An embodiment of the present disclosure further provides a mobile terminal, preferably a cellphone. The mobile terminal includes any of devices for obtaining time according to the above embodiments of the present invention, and further includes a RF (Radio Frequency) circuit, an audio circuit, and a power circuit, where the RF circuit is configured for establishing communication between the cellphone and a wireless network to receive and transmit data between the cellphone and the wireless network;

the audio circuit is configured for capturing voice and converting the captured voice into voice data so that the cellphone can transmit the voice data to the wireless network via the RF circuit, and/or for reproducing the voice data received from the wireless network via the RF circuit by the cellphone as the voice and playing the voice to the user;

the power circuit is configured for supplying power to various circuits or devices of the cellphone to ensure a normal work of the cellphone.

The above mobile terminal may be a cellphone, a human-machine interactive terminal, an e-book, or other terminal devices having a display function. In the case that the mobile terminal is a cellphone, the cellphone further includes: a housing, a circuit board, a microphone and a loudspeaker so as to accomplish basic functions of the cellphone. The housing, the circuit board, the micro-phone and the loudspeaker are introduced respectively below.

The circuit board is arranged within the housing.

The microphone is configured for capturing voice and converting the captured voice into voice data so that the cellphone can transmit the voice data to the wireless network via the RF circuit.

The loudspeaker is configured for reproducing the voice data received from the wireless wireless via the RF circuit by the cellphone as the voice and playing the voice to the user.

Figure 4:
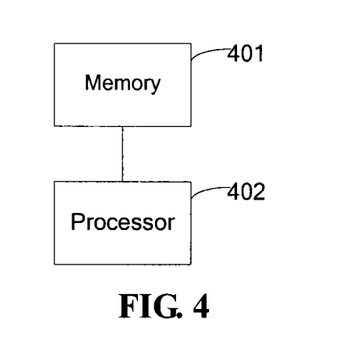
FIG. 4 is a schematic diagram showing the structure of a terminal according to an embodiment of the present invention.

FIG. 4 is a schematic diagram showing the structure of a terminal according to an embodiment of the present invention. The terminal includes:

a memory 401;

one or more programs stored in the memory and performed by one or more processors 402, with the one or more programs includes the instructions for performing the operations below:

receiving a first message and determining a sub-message identifier carried in the first message, with the sub-message identifier being configured for indicating that the first message is one of a plurality of sub-messages forming a short message;

allocating a storage space to the short message according to the first message, with the number of storage units contained in the storage space being equal to the number of the sub-messages contained in the short message, and the storage units contained in the storage space having ordered positions;

storing the first message and the subsequently received at least one second message to corresponding storage units in the storage space according to sub-message identifiers of both the first message and the subsequently received at least one second message; and combining the sub-messages stored in all the storage units in the storage space.

Preferably, the receiving a first message and determining a sub-message identifier carried in the first message, with the sub-message identifier being configured for indicating that the first message is one of a plurality of sub-messages forming a short message includes:

receiving a first message and determining according to a preset characteristic information repository whether the first message carries information consistent with any one of characteristic information in the preset characteristic information repository, so as to determine that the first message carries the sub-message identifier if the first message carries the information consistent with any one of characteristic information in the preset characteristic information repository.

Preferably, the allocating a storage space to the short message according to the first message, with the number of storage units contained in the storage space being equal to the number of the sub-messages contained in the short message, and the storage units contained in the storage space having ordered positions includes:

determining the number of the sub-messages contained in the short message according to the sub-message identifier; and allocating the storage space to the short message according to the number of the sub-messages contained in the short message, with the number of storage units contained in the storage space being equal to the number of the sub-messages contained in the short message, and the storage units contained in the storage space having ordered positions.

Preferably, the storing the first message and the subsequently received at least one second message to corresponding storage units in the storage space according to the sub-message identifiers of both the first message and subsequently received at least one second message includes:

obtaining, according to the sub-message identifiers of both the first message and the subsequently received at least one second message, positions of the first message and the subsequently received at least one second message in the short message, respectively; and storing, according to the positions of the first message and the subsequently received at least one second message in the short message as well as the ordered position of each of the storage units in the storage space, the first message and the subsequently received at least one second message to the corresponding storage units of which the ordered positions in the storage space correspond to the positions of the first message and the subsequently received at least one second message in the short message, respectively.

Preferably, the combining the sub-messages stored in all the storage units in the storage space includes:

determining whether each of the storage units in the storage space has stored a sub-message, and combining the sub-messages stored in all the storage units in the storage space if each of the storage units in the storage space has stored a sub-message.

Preferably, after determining whether each of the storage units in the storage space has stored a sub-message, the method further includes:

ending, if not all of the storage units in the storage space have stored a sub-message and it is determined that a time period from time of receiving the first message to current time exceeds a preset time period.

The sub-message identifier is information either prefixed or suffixed to the first message.

An embodiment of the present invention provides a readable storage medium storing one or more programs performed by one or more processors to accomplish a message combination method, including:

receiving a first message and determining a sub-message identifier carried in the first message, with the sub-message identifier being configured for indicating that the first message is one of a plurality of sub-messages forming a short message;

allocating a storage space to the short message according to the first message, with the number of storage units contained in the storage space being equal to the number of the sub-messages contained in the short message, and the storage units contained in the storage space having ordered positions;

storing the first message and the subsequently received at least one second message to corresponding storage units in the storage space according to sub-message identifiers of both the first message and the subsequently received at least one second message; and combining the sub-messages stored in all the storage units in the storage space.

Preferably, the receiving a first message and determining a sub-message identifier carried in the first message, with the sub-message identifier being configured for indicating that the first message is one of a plurality of sub-messages forming a short message includes:

receiving a first message and determining according to a preset characteristic information repository whether the first message carries information consistent with any one of characteristic information in the preset characteristic information repository, so as to determine that the first message carries the sub-message identifier if the first message carries the information consistent with any one of characteristic information in the preset characteristic information repository.

Preferably, the allocating a storage space to the short message according to the first message, with the number of storage units contained in the storage space being equal to the number of the sub-messages contained in the short message, and the storage units contained in the storage space having ordered positions includes:

determining the number of the sub-messages contained in the short message according to the sub-message identifier; and allocating the storage space to the short message according to the number of the sub-messages contained in the short message, with the number of storage units contained in the storage space being equal to the number of the sub-messages contained in the short message, and the storage units contained in the storage space having ordered positions.

Preferably, the storing the first message and the subsequently received at least one second message to corresponding storage units in the storage space according to the sub-message identifiers of both the first message and subsequently received at least one second message includes:

obtaining, according to the sub-message identifiers of both the first message and the subsequently received at least one second message, positions of the first message and the subsequently received at least one second message in the short message, respectively; and storing, according to the positions of the first message and the subsequently received at least one second message in the short message as well as the ordered position of each of the storage units in the storage space, the first message and the subsequently received at least one second message to the corresponding storage units of which the ordered positions in the storage space correspond to the positions of the first message and the subsequently received at least one second message in the short message, respectively.

Preferably, the combining the sub-messages stored in all the storage units in the storage space includes:

determining whether each of the storage units in the storage space has stored a sub-message, and combining the sub-messages stored in all the storage units in the storage space if each of the storage units in the storage space has stored a sub-message.

Preferably, after determining whether each of the storage units in the storage space has stored a sub-message, the method further includes:

ending, if not all of the storage units in the storage space have stored a sub-message and it is determined that a time period from time of receiving the first message to current time exceeds a preset time period.

The sub-message identifier is information either prefixed or suffixed to the first message.

It can be understood by those skilled in the art that all or a part of steps for achieving the above embodiments can be implemented through hardware, and can also be implemented through the related hardware instructed by programs which can be stored in a computer readable storage medium. The above-mentioned storage medium can be a read-only memory, a magnetic disk or an optical disk and so on.

The preferred embodiments of the present invention are described as above, but not intended to limit the present invention. Within the spirit and principle of the present invention, changes, substitutions conceived by any one of those skilled in the art within the disclosed technical scope of the invention should fall into the scope of protection of the present invention.

The invention claimed is:

1. A message combination method, comprising:
receiving, by a mobile terminal, a first message and determining a sub-message identifier carried in the first message, with the sub-message identifier being configured for indicating that the first message is one of a plurality of sub-messages forming a short message;
allocating, by the mobile terminal, a storage space to the short message according to the first message, with the number of storage units contained in the storage space being equal to the number of the sub-messages contained in the short message, and the storage units contained in the storage space having ordered positions;
storing, by the mobile terminal, the first message and the subsequently received at least one second message to corresponding storage units in the storage space respectively according to sub-message identifiers of both the first message and the subsequently received at least one second message; and
combining, by the mobile terminal, the sub-messages stored in all the storage units in the storage space.

2. The method of claim 1, wherein the receiving, by the mobile terminal, a first message and determining a sub-message identifier carried in the first message, with the sub-message identifier being configured for indicating that the first message is one of a plurality of sub-messages forming a short message comprises:
receiving, by the mobile terminal, a first message and determining according to a preset characteristic information repository whether the first message carries information consistent with any one of characteristic information in the preset characteristic information repository, so as to determine that the first message carries the sub-message identifier if the first message carries the information consistent with any one of characteristic information in the preset characteristic information repository.

3. The method of claim 1, wherein the allocating, by the mobile terminal, a storage space to the short message according to the first message, with the number of storage units contained in the storage space being equal to the number of the sub-messages contained in the short message, and the storage units contained in the storage space having ordered positions comprises:
determining the number of the sub-messages contained in the short message according to the sub-message identifier; and allocating the storage space to the short message according to the number of the sub-messages contained in the short message, with the number of storage units contained in the storage space being equal to the number of the sub-messages contained in the short message, and the storage units contained in the storage space having ordered positions.

4. The method of claim 1, wherein the storing, by the mobile terminal, the first message and the subsequently received at least one second message to corresponding storage units in the storage space respectively according to the sub-message identifiers of both the first message and subsequently received at least one second message comprises:
obtaining, according to the sub-message identifiers of both the first message and the subsequently received at least one second message, positions of the first message and the subsequently received at least one second message in the short message, respectively; and
storing, according to the positions of the first message and the subsequently received at least one second message in the short message as well as the ordered position of each of the storage units in the storage space, the first message and the subsequently received at least one second message to the corresponding storage units of which the ordered positions in the storage space correspond to the positions of the first message and the subsequently received at least one second message in the short message, respectively.

5. The method of claim 1, wherein the combining, by the mobile terminal, the sub-messages stored in all the storage units in the storage space comprises:
determining whether each of the storage units in the storage space has stored a sub-message, and combining the sub-messages stored in all the storage units in the storage space if each of the storage units in the storage space has stored a sub-message.

6. The method of claim 5, wherein after determining whether each of the storage units in the storage space has stored a sub-message, the method further comprises:
ending, if not all of the storage units in the storage space have stored a sub-message and it is determined that a time period from time of receiving the first message to current time exceeds a preset time period.

7. The method of claim 1, wherein the sub-message identifier is information either prefixed or suffixed to the first message.

8. A message combination device, comprising one or more processors, a memory, and a plurality of program modules stored in the memory and configured to be executed by the one or more processors, wherein the plurality of program modules further comprising:
a reception module configured for receiving a first message and determining a sub-message identifier carried in the first message, with the sub-message identifier being configured for indicating that the first message is one of a plurality of sub-messages forming a short message;
an allocation module configured for allocating a storage space to the short message according to the first message, with the number of storage units contained in the storage space being equal to the number of the sub-messages contained in the short message, and the storage units contained in the storage space having ordered positions;
a storage module configured for storing the first message and the subsequently received at least one second message to corresponding storage units in the storage space respectively according to sub-message identifiers of both the first message and the subsequently received at least one second message; and
a combination module configured for combining the sub-messages stored in all the storage units in the storage space.

9. The device of claim 8, wherein the reception module is specifically configured for receiving a first message and determining according to a preset characteristic information repository whether the first message carries information consistent with any one of characteristic information in the preset characteristic information repository, so as to determine that the first message carries the sub-message identifier if the first message carries the information consistent with any one of characteristic information in the preset characteristic information repository.

10. The device of claim 8, wherein, the allocation module comprises:
a determination unit configured for determining the number of the sub-messages contained in the short message according to the sub-message identifier; and
an allocation unit configured for allocating the storage space to the short message according to the number of the sub-messages contained in the short message, with the number of storage units contained in the storage space being equal to the number of the sub-messages contained in the short message.

11. The device of claim 8, wherein, the storage module is specifically configured for obtaining, according to the sub-message identifiers of both the first message and the subsequently received at least one second message, positions of the first message and the subsequently received at least one second message in the short message, respectively; and storing, according to the positions of the first message and the subsequently received at least one second message in the short message as well as the ordered position of each of the storage units in the storage space, the first message and the subsequently received at least one second message to the corresponding storage units of which the ordered positions in the storage space correspond to the positions of the first message and the subsequently received at least one second message in the short message, respectively.

12. The device of claim 8, wherein, the combination module is specifically configured for determining whether each of the storage units in the storage space has stored a sub-message, and combining the sub-messages stored in all the storage units in the storage space if each of the storage units in the storage space has stored a sub-message.

13. The device of claim 12, wherein, the combination module is further configured for ending, if not all of the storage units in the storage space have stored a sub-message and it is determined that a time period from time of receiving the first message to current time exceeds a preset time period.

14. The device of claim 8, wherein, the sub-message identifier is information either prefixed or suffixed to the first message.

15. A terminal, comprising:
a memory;
one or more programs stored in the memory and performed by one or more processors, with the one or more programs comprising the instructions for performing the operations below:
receiving a first message and determining a sub-message identifier carried in the first message, with the sub-message identifier being configured for indicating that the first message is one of a plurality of sub-messages forming a short message;

allocating a storage space to the short message according to the first message, with the number of storage units contained in the storage space being equal to the number of the sub-messages contained in the short message, and the storage units contained in the storage space having ordered positions;

storing the first message and the subsequently received at least one second message to corresponding storage units in the storage space respectively according to sub-message identifiers of both the first message and the subsequently received at least one second message; and combining the sub-messages stored in all the storage units in the storage space.

16. The terminal of claim 15, wherein, the receiving a first message and determining a sub-message identifier carried in the first message, with the sub-message identifier being configured for indicating that the first message is one of a plurality of sub-messages forming a short message comprises:

receiving a first message and determining according to a preset characteristic information repository whether the first message carries information consistent with any one of characteristic information in the preset characteristic information repository, so as to determine that the first message carries the sub-message identifier if the first message carries the information consistent with any one of characteristic information in the preset characteristic information repository.

17. The terminal of claim 15, wherein, the allocating a storage space to the short message according to the first message, with the number of storage units contained in the storage space being equal to the number of the sub-messages contained in the short message, and the storage units contained in the storage space having ordered positions comprises:

determining the number of the sub-messages contained in the short message according to the sub-message identifier; and allocating the storage space to the short message according to the number of the sub-messages contained in the short message, with the number of storage units contained in the storage space being equal to the number of the sub-messages contained in the short message, and the storage units contained in the storage space having ordered positions.

18. The terminal of claim 15, wherein, the storing the first message and the subsequently received at least one second message to corresponding storage units in the storage space according to the sub-message identifiers of both the first message and subsequently received at least one second message comprises:

obtaining, according to the sub-message identifiers of both the first message and the subsequently received at least one second message, positions of the first message and the subsequently received at least one second message in the short message, respectively; and storing, according to the positions of the first message and the subsequently received at least one second message in the short message as well as the ordered position of each of the storage units in the storage space, the first message and the subsequently received at least one second message to the corresponding storage units of which the ordered positions in the storage space correspond to the positions of the first message and the subsequently received at least one second message in the short message, respectively.

19. The terminal of claim 15, wherein, the combining the sub-messages stored in all the storage units in the storage space comprises:

determining whether each of the storage units in the storage space has stored a sub-message, and combining the sub-messages stored in all the storage units in the storage space if each of the storage units in the storage space has stored a sub-message.

20. The terminal of claim 19, wherein, after determining whether each of the storage units in the storage space has stored a sub-message, the instructions for performing the further operations below:

ending, if not all of the storage units in the storage space have stored a sub-message and it is determined that a time period from time of receiving the first message to current time exceeds a preset time period.

* * * * *